United States Patent [19]

Boike

[11] Patent Number: 4,819,922

[45] Date of Patent: Apr. 11, 1989

[54] CLAMPING APPARATUS

[76] Inventor: Charles R. Boike, 24051 Cottrell, Mt. Clemens, Mich. 48043

[21] Appl. No.: 155,133

[22] Filed: Feb. 11, 1988

[51] Int. Cl.[4] .................... B23Q 3/02

[52] U.S. Cl. .................... 269/45; 269/71; 269/100; 269/228; 269/900

[58] Field of Search .................... 269/99, 100, 91, 93, 269/94, 71, 45, 17, 6, 104, 102, 228, 269, 900; 81/424.5, 426

[56] References Cited

U.S. PATENT DOCUMENTS

| | | | |
|---|---|---|---|
| 341,662 | 5/1886 | Kirkland | 269/45 |
| 1,382,102 | 6/1921 | Lukaszewski | 269/94 |
| 2,458,370 | 1/1949 | Geddes | 269/45 |
| 2,913,830 | 11/1959 | Schroter | 269/93 |
| 2,991,669 | 7/1961 | Stock | 269/45 |
| 3,371,925 | 3/1968 | Blatt et al. | 269/91 |
| 3,589,706 | 6/1971 | Putman | 269/102 |
| 3,947,010 | 3/1976 | Zeller | 269/100 |
| 3,984,092 | 10/1976 | Fitzpatrick | 269/100 |
| 4,353,536 | 10/1982 | Mazzotta | 269/100 |

*Primary Examiner*—Robert C. Watson

*Attorney, Agent, or Firm*—Brooks & Kushman

[57] ABSTRACT

A clamping system is disclosed for use with an assembly jig. It features a clamp having one jaw consisting of a pin and the other jaw including a pad which when closed will be spaced from but parallel to the pin. The pin is to be inserted into a circular locating device which is joined to the frame of the assembly jig. Due to the circular nature of the locator and use of the pin, the workpiece can be grasped in an over-center locking position in almost any orientation. The clamping device together with the assembly jig provides standardized pieces that can be used for limited production items that need to be held upon a jig relationship when locked.

17 Claims, 3 Drawing Sheets

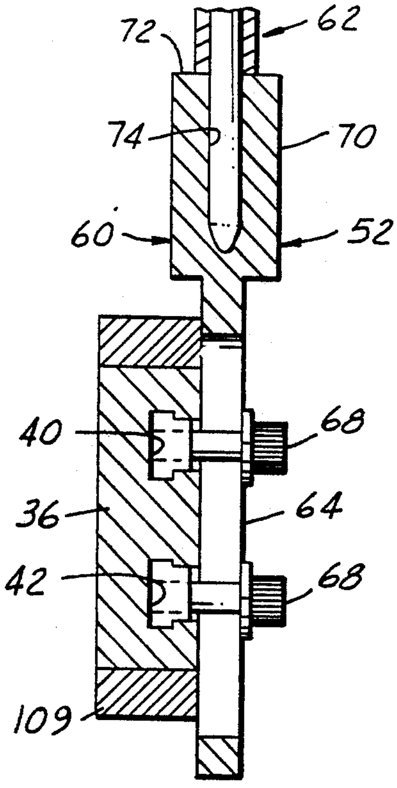
FIG.4
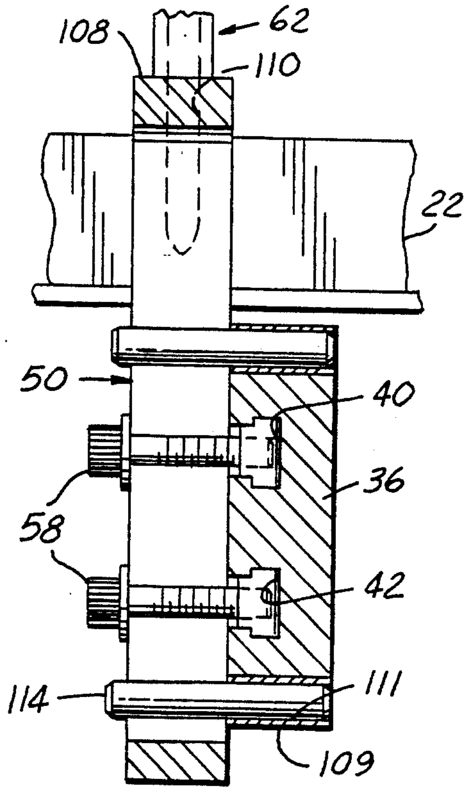
FIG.5
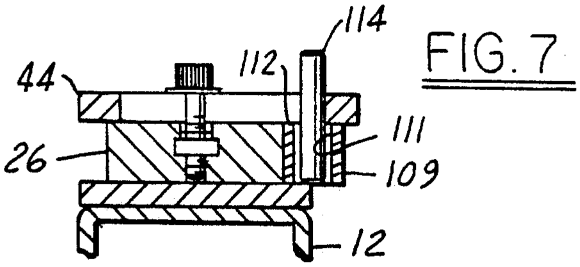
FIG.7
FIG.8
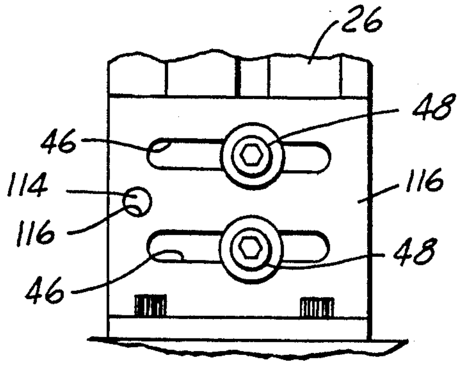

CLAMPING APPARATUS

BACKGROUND OF THE INVENTION

The current invention relates to a clamping apparatus to be used with assembly jigs used in positioning limited production workpieces for machining and assembling.

In many areas of industry it is necessary to deal with workpieces that need to be held in place for machining processes or as part of the assembly process. These pieces are often irregular and thus will not be suitable for positioning in a standardized jig. If large numbers of the irregular pieces are needed, it is possible to build a special jig for the specific pieces economically. However, the manufacturer is often faced with pieces that are for limited production making it inefficient to make a special jig for each type of piece. In the past there has been no efficient way to avoid this inefficiency. Assembly jigs were therefore usually individualized for the workpiece by welding new and different members together so to allow attachment of the piece to be worked on. The purpose of the current invention is to a clamping system which avoids the inefficiency of having to in essence construct a new jig each time it is used for a different piece.

The current invention increases the efficiency by using a jig frame including a series of T-slotted tracks. Standardized members are then attached to the T-slotted tracks by T-bolts which allow easy positioning of the standardized members in multiple orientations. These attachments can be additional track members, support surfaces or clamps. The invention features a new clamp design which can be attached to the T-slotted tracks at a number of different orientations. The attachment is by a locator unit into which the actual clamping member is inserted by means of a pin into a central hole in an essentially circular protrusion of the locator. The clamping surface is aligned parallel to the pin to allow clamping of the workpiece in essentially 360 degrees. By using standardized members that can undertake a wide range of orientations, specialized units are not necessary to hold each workpiece. The jig can be changed between workpieces by merely re-orienting the various members of the assembly through loosening of T-bolts and movement of the standardized pieces.

Not only does this have the advantage of cutting down on the time used for setting up each new workpiece but also has the advantage of removing the need to keep on hand additional brackets and welding equipment. Another advantage of the invention is that the clamping device provides an over-center clamping force for a wide range of different angular relationships between the jig and the workpiece to be held.

BRIEF DESCRIPTION OF THE DRAWINGS

FIG. 4 is an enlarged cross-sectional view taken along line 44 of FIG. 2.

FIG. 5 is an enlarged cross-sectional view taken along line 55 of FIG. 2.

FIG. 7 is a partial cross-sectional view taken along line 77 of FIG. 3.

FIG. 8 is an alternative embodiment showing the relationship of a bracket and positioning pin.

BRIEF DESCRIPTION OF THE PREFERRED EMBODIMENTS

Figure 1:
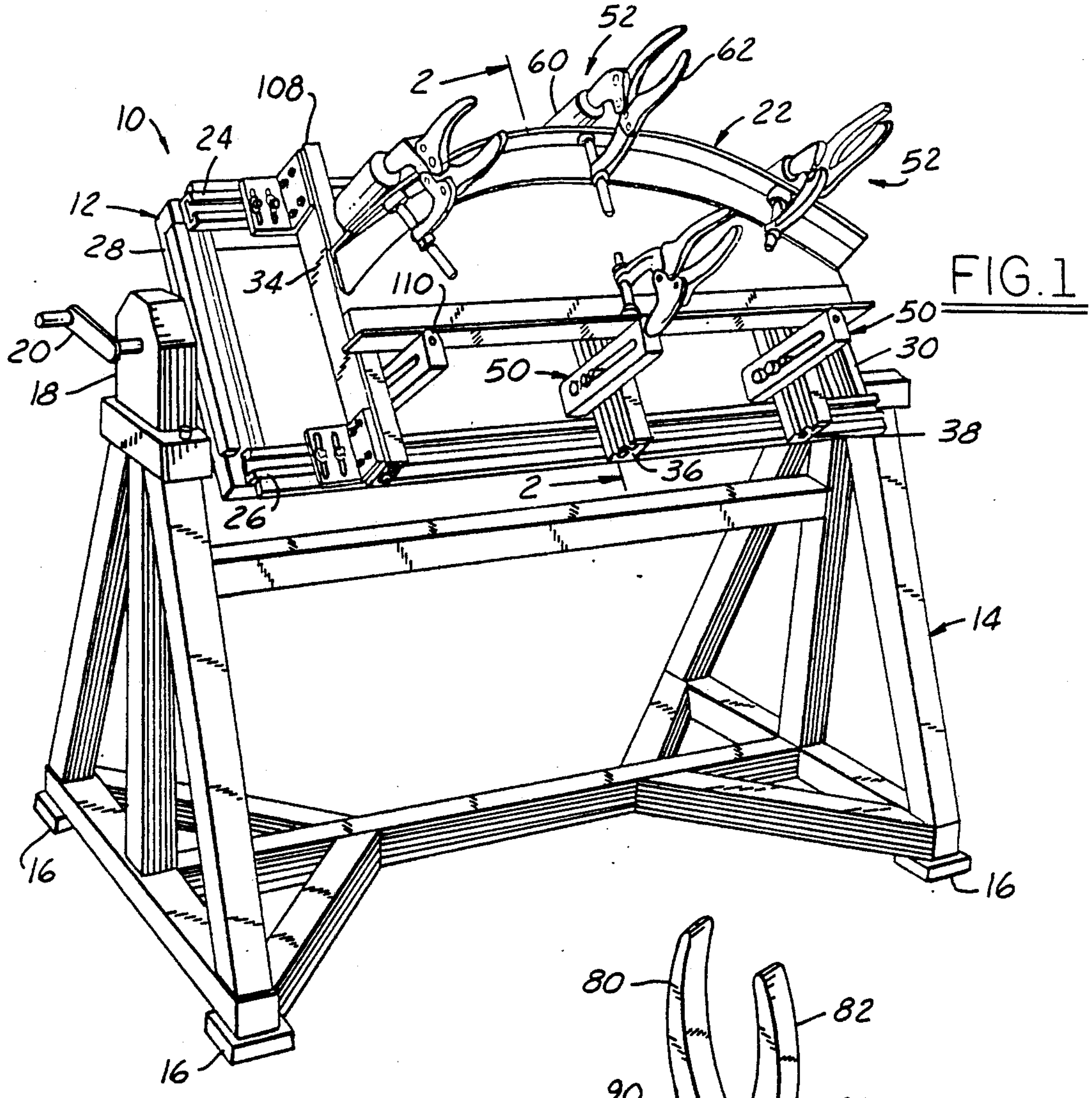
FIG. 1 is a perspective view of an assembly jig using an embodiment of the present invention shown holding a workpiece in place.
Figure 6:
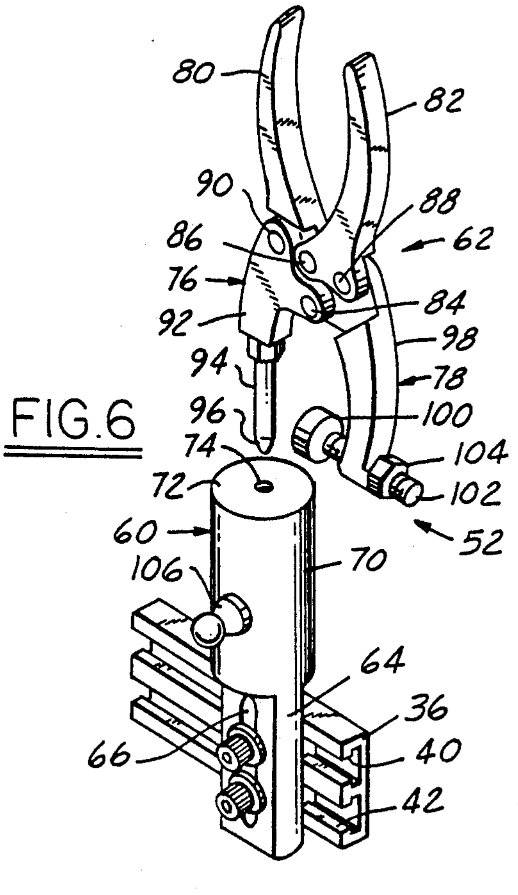
FIG. 6 is a perspective view of a clamping unit used with the invention.

The preferred embodiment of applicant's invention includes an assembly jig 10 featuring a standard frame 12. This frame can be mounted directly on the floor or preferably on a trunnion stand 14 having wheel supports 16 to move the jig assembly to any desired positioned within the plant. The trunnion 18 allows the frame to be rotated by suitable means, such as handle 20, with respect to the stand to any desired angular relationship. The frame itself is preferably rectangular in shape and sufficiently large to hold along one face of it workpiece 22. For larger frames and heavier workpieces, cross-supports may be welded to the frame for greater rigidity.

On the one face of frame 12 around its periphery are positioned mounting tracks 24, 26, 28, 30. Each mounting track has a T-slot along its length. Normally, a series of slide tracks 34, 36, 38 will be regularly spaced along the frame extending from the top mounting track 24 to the bottom mounting track 26. The sliding tracks, preferably have a pair of parallel T-slots 40, 42 along their length. The slide tracks are normally attached to the mounting tracks so that the plane of the T-slots is perpendicular to the plane of the T-slots in the mounting tracks. In the preferred embodiment, the mounting tracks have joined to each end one leg of L-shaped brackets 44 in a fixed manner, by welding or the like. The other leg of each bracket has formed in it a pair of slots 46. The slide tracks are then joined to the mounting tracks by a pair of T-nuts 48 passing through the slots of each bracket. To ensure proper alignment at a 90° angle, some sliding tracks may be outfitted with devices known to the art to maintain the 90° angle between the mounting track and the slide track, an example of which is a McGill roller (not shown). Alternatively, to give greater variety of positions by which the sliding in tracks and mounting tracks can be connected, the bracket may have slots on each leg and be joined by T-bolts to the T-slots of each track.

While a 90° relationship between the mounting tracks and slide tracks will be the most common relationship, the bracket-T-slot relationship joining the two types of tracks allows almost an unlimited angular relationship to be formed between the two elements. By loosening the T-bolts within the slots, the sliding tracks may be slid along the mounting track to vary the angular relationship between them. Alternatively, the sliding track might be mounted between the top mounting track and one of the side mounting tracks 26, 30 to provide other relationships for the slide track. Due to the ease by which the tracks are connected by the T-nuts within the T-slots and the length of the slots in the brackets, an almost unlimited number of arrangements are possible without the need to make any permanent changes to the frame or the slide tracks being mounted thereon.

After a basic open framework of a face against which the workpiece is to be held is established by the sliding and mounting tracks, a template for the workpiece is reviewed to determine the location of additional hardware needed to hold the workpiece against the frame face. the additional hardware can take the form of blocks, abutments, pins, or any other standard jig piece provided they are modified in an appropriate manner to allow them to be removably held within the T-slot network of the jig.

In the present embodiment, the additional hardware is introduced in the form of support units 50 and clamping units 52.

Each support unit 50 is essentially a rectangular piece of metal through which a longitudinal slot 54 is made. The edges 56, 57 of the support unit parallel to the slot 54 are designed to provide support surfaces for the workpiece. Preferably the edge is formed with a semi-cylindrical surface, such as edge 56. There the support unit is joined to the slide tracks by a pair of T-nuts 58. Since the slot is longer than the distance between the T-slots of the slide track the slot-T-nut combination allows each support unit to be joined to the slide track in a wide range of angular relationships.

At suitable places along the edge of the workpiece are placed clamping units 52. Each clamping unit includes a locator member 60 and a clamp member 62. Each locator member 60 has an attachment portion 64 to allow joining of the clamping unit to the slide track. The attachment portion includes a single longitudinal slot 66 through which a pair of T-nuts 68 are passed with each of the T-nuts being placed within one each of the slots in the slide track. As with the other hardware, the use of the slot and T-nut combination allows a great deal of angular variation between the orientation of the locator unit and the track. At the end of the locator unit is formed a abutment portion having a convex arcuate outer surface 70, preferably cylindrical, or at least semi-cylindrical, extending to the end 72 of the member. On the end of the member is formed a hole 74 preferably at the axis of the surface. In some cases where the axis may be a significant distance from the surface the hole may be positioned along a line between the surface and the axis. The outer surface 70 of the circular member will provide a support surface while the hole is designed to mate with a portion of the clamp member.

The clamp member 62 of applicant's invention is a standard toggle clamping device used with jigs modified by special jaws. The clamp member is made up of two jaws 76, 78 and two handles 80, 82. Each of these four members are pivotably joined to two of the other members by pivots. One pivot 84 joins the two jaws together. The second pivot 86 joins the two handles while the remaining two pivots 88, 90 each join one of the handles to one of the jaws. In the locked position, the handles are pulled together as far as possible causing the handle pivot 86 to pass through a line between the two handled-jaw pivots 88, 90 towards the jaw pivot 84. In this closed or locked relationship, the jaws cannot be moved directly away from each other by pressure on the jaws. To open the jaws, the handles are moved away from one another pulling the handle pivot 86 through the line between the handled-jaw pivots 88, 90 away from the jaw pivot 84. After the handle pivot passes through the line, further separation of the handles acts through the remaining pivots to cause the jaws to separate from one another. The positioning jaw arm 92 of jaw 76 of the clamp is made to hold a pin 94. This pin will slide within the hole 74 of the locator member. The forward end 96 of the pin preferably is tapered to allow easy placement of the pin initially within the hole. The other jaw arm 98 of jaw 78 includes an adjustable clamp pad 100. This can take the form of bolt 102 where the head of the bolt acts as the pad. A nut 104 can then be used to lock the pad at the desired location. Rotation of the nut will act to loosen or tighten the pad against the workpiece. When the clamp is closed, the pad will be substantially parallel to the center line of the pin and the center line of the bolt is aligned so to intersect the center line of the pin. This will give over center locking of the workpiece.

Normally, frictional forces will resist further movement of the pin once it is inserted and the clamping member closed. Alternatively, a locking pin 106 may be positioned on the positioning portion which when tightened will hold the pin in place. Use of a locking pin may reduce the effective arcuate surface suitable for holding the workpiece thereby reducing the possible angular relationship between the locator and clamp members.

In operation, once the shape of the piece to be machined is established the sliding tracks can be quickly moved to any desired position across the frame. An angular relationship between the slide track members and the mounting tracks can be varied due to the position of the T-nuts within the slots and the brackets so to allow slight angular displacements to correspond with the contour of the part to worked. Similarly, the support units and other hardware can be positioned along the sliding track to provide a support for the workpiece.

Since the hardware is likewise joined to tracks by slotted brackets and T-nuts the angular relationship between the slide track and the hardware may be varied to correspond with the contours of the particular part to machined. Finally, the clamping units are placed along the slide tracks where it is desired to hold the machining piece in place and jig is now ready to receive the workpiece. Once the workpiece is positioned against the hardware, the clamping units are adjusted so that the workpiece will rest upon the surface of the semi-circular portion of the locator unit. At this point, the workpiece is locked in place by the clamps. The pins of the clamps are positioned within the holes of the locator units and the clamping jaw is positioned over the workpiece, so to hold the workpiece firmly between the clamping jaws and the surface of the locator member. The clamp is then locked in place by an over-center locking force caused by closing the clamp. It may be necessary to tighten the bolt against the workpiece by a wrench.

To aid in clamping the workpiece in place support units 50 can be modified to be used as additional locator members. On the end 108 of the unit a hole 110 can be made to receive the pin 94 of a clamp member.

When the machining operation is finished, the clamps are opened and the workpiece removed. Where there are a series of similar workpieces, all that need be done after unclamping is the re-positioning of the new workpiece and then re-clamping for machining or assembly. If, however, the next piece to be machined varies slightly, the appropriate T-nuts can be loosened and the appropriate slide track plate or locator unit may be shifted accordingly and then re-tightened. Even if the next workpiece varies significantly, it is merely a matter of removing and rearranging T-nuts, tracks, supports and locator units to correspond with the new design. No welding or other specialized activities are needed and all the parts are reusable.

Figure 2:
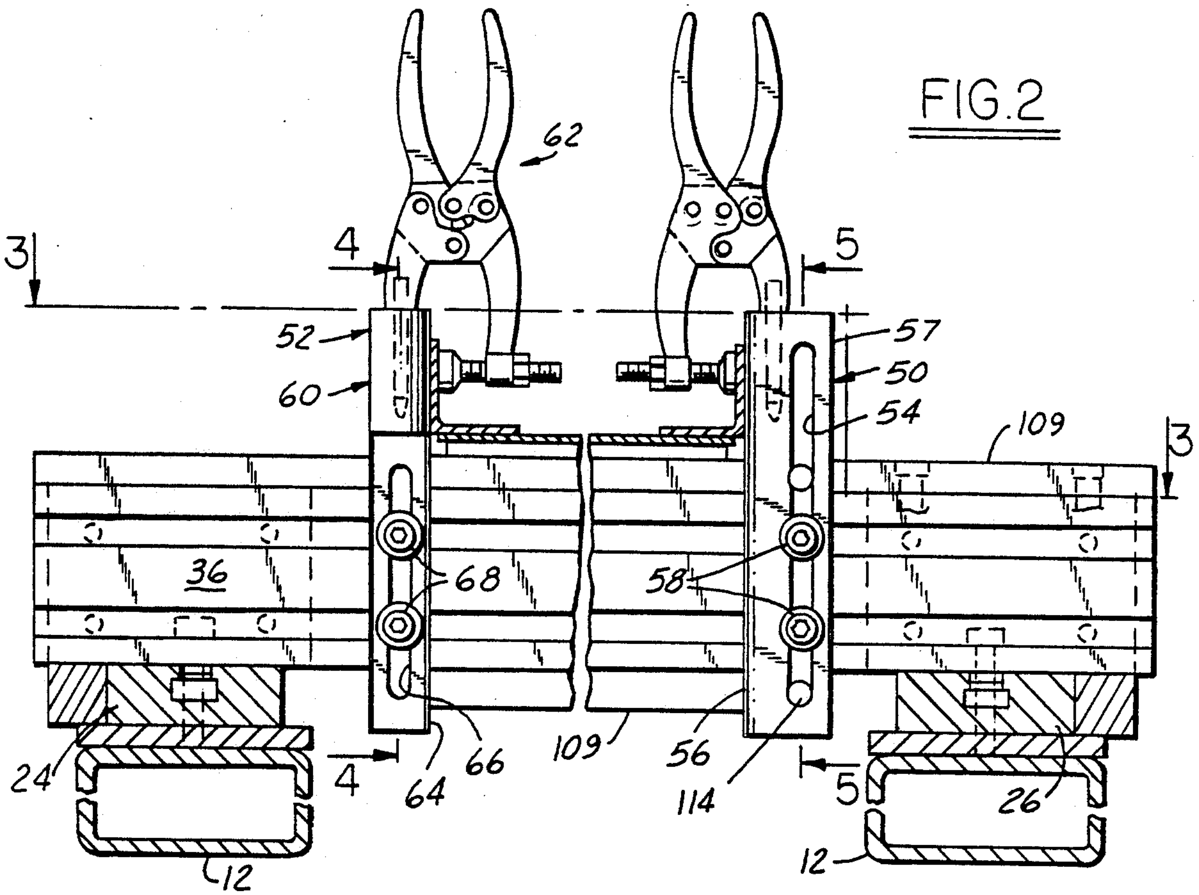
FIG. 2 is an enlarged cross-sectional view taken along line 22 of FIG. 1.
Figure 3:
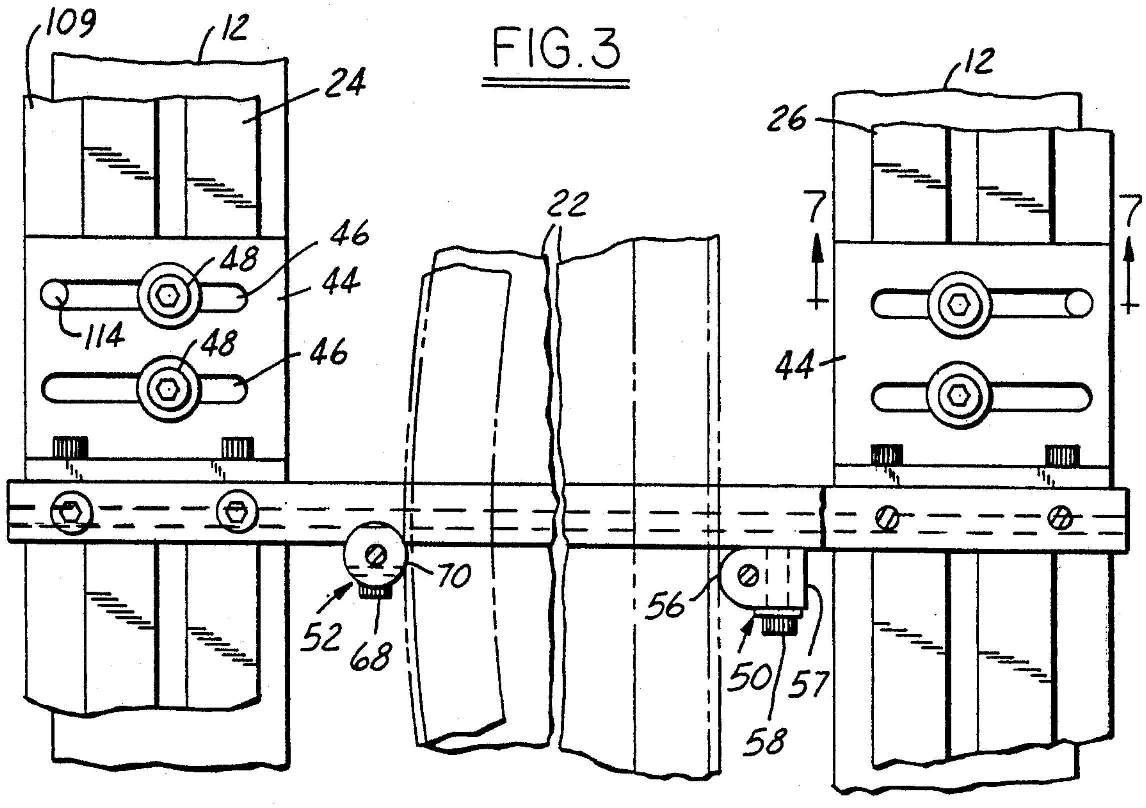
FIG. 3 is a partial side view taken parallel to the workpiece.

In some instances where extremely precise positioning of the workpiece is desired, positioning bars 109 may be added alongside the mounting and slide tracks. These metal bars can be used as follows: Once the desired relationship between the various tracks or the hardware in the tracks is established as shown in FIGS. 2 and 3, a hole 111 will be drilled into the positioning bar at the precise location desired. Preferably, this is done through an oversized hole and a bushing 112 is placed within it. The hardware is then positioned at the desired location and a pin 114 inserted through the slot of a bracket or of the hardware into the hole thereby precisely defining the desired location. FIG. 8 shows an alternative bracket 116 where a hole 118 is formed in the bracket especially for use with a positioning pin 114. The use of a positioning bar is also advantageous where two different workpiece designs will be alternated on the same assembly jig. The positioning pins provide a quick method to define and recreate the earlier alignments.

Although the current description assumed a relatively straightforward workpiece design, the tracks can be fitted together by brackets in different combinations to allow the positioning of the locator units and other hardware in almost any orientation without the need for special tools or non-standard units.

I claim:

1. A clamping system for holding a workpiece comprising a locating member having a portion with a convex arcuate surface extending to one end of the locating member for abutting the workpiece while clamped and a hole in said end along the axis of the surface; and a clamp having a pair of jaws and means for moving the jaws between an opened position and a closed position where said first jaw has means for insertion in said hole and said second jaw includes a clamping surface aligned to abut and hold a workpiece positioned on the surface of the abutment position when the first jaw is inserted in said hole and the jaws are in the closed position.

2. The clamping system of claim 1 further comprising a frame upon which workpieces to be held and means for attaching the locating member to the frame including a joinder element having a loose and locked condition, first element-retaining means which is part of the frame and a second element-retaining means which is part of the locating member, at least one of the element-retaining members having an elongated slot in which the element is retained and which allows relative movement between the frame and the locating member along the element when the element is in a loose condition, the frame and locating member maintaining their relationship when the element is in a locked condition.

3. The clamping system of claim 2 wherein rotational movement is allowed around the element while it is in a loose condition.

4. The clamping system of claim 2 wherein both retaining means include elongated slots in which the element is retained.

5. The clamping system of claim 1 wherein the convex arcuate surface extends at least 180° around the abutment portion of the locating member.

6. The clamping system of claim 1 wherein the convex arcuate surface is a cylinder.

7. The clamping system of claim 1 wherein the means for moving the jaws include a pair of handles and toggle means, said toggle means joining the jaws and the handles so that when the handles are opened the jaws will separate but as the handles are closed the jaws will move towards one another until the jaws reach their closed position with further movement of the handles towards one another locking the jaws in place.

8. A clamp comprising a pair of jaws where the first jaw terminates in a pin and the second jaw includes a clamping surface; and means for moving the jaws between an opened position and closed position, the closed position characterized by the clamping surface aligned substantially parallel to the center line of the pin while the jaws remain spaced apart, the means for moving the jaws including a pair of handles and toggle means, and the toggle means joining the jaws and the handles so that when the handles are opened the jaws will separate but as the handles are closed the jaws will move towards one another until the jaws reach their closed position with further movement of the handles towards one another locking the jaws in place.

9. The clamp of claim 8 wherein the end of the pin is tapered.

10. The clamp of claim 8 wherein each of said jaws further comprises a jaw arm extending from the pivot and where said pin is inserted into the jaw arm of the first jaw and the clamping surface is adjustably connected to the jaw arm of said second arm so to allow the distance between the pin and clamping surface to be selectively varied by movement of the clamping surface relative to the arm to which it is connected.

11. A clamping system for holding a workpiece comprising a locating member having a portion with a work support surface extending to one end of the locating member for abutting the workpiece while clamped and a hole in said end; and a clamp having a pair of jaws and means for moving the jaws between an opened position and a closed position where said first jaw has means for insertion in said hole and said second jaw includes a clamping surface aligned to abut and hold a workpiece positioned on the surface of the abutment position when the first jaw is inserted in said hole and the jaws are in the closed position.

12. The clamping system of claim 11 wherein the means for insertion includes a susbstantially straight member which enters into the hole, and the clamping surface will be spaced from but parallel to the straight member when the jaws are in the closed position.

13. The clamping system of claim 11 wherein the means for insertion includes a rod which enters into the hole, and where the clamping surface moves in a arc as the jaws close, the arc being in the same plane as the axis of the rod.

14. The clamping system of claim 11 wherein the clamping surface can be moved relative to the support surface after the jaws are closed by adjustment means on the second jaw.

15. A clamping system for holding a workpiece comprising a frame upon which a workpiece may be held including a plurality of pin receivers;

a plurality of clamps, each comprising a pair of jaws where the first jaw terminates in a pin which is insertable in the pin-receiving means and said second jaw includes a clamping surface; and means for moving the jaws between an open position and a closed position, said closed position characterized by the clamping surface aligned substantially parallel to the center line of said pin while the jaws remain spaced apart.

16. The clamp of claim 15 wherein each of said jaws further comprises a jaw arm extending from the pivot and where said pin is inserted into the jaw arm of the first jaw and the clamping surface is adjustably connected to the jaw arm of said second arm so to allow the distance between the pin and clamping surface to be selectively varied by movement of the clamping surface relative to the arm to which it is connected.

17. The clamp of claim 15 wherein the means for moving the jaws include a pair of handles and toggle means, said toggle means joining the jaws and the handles so that when the handles are opened the jaws will separate but as the handles are closed the jaws will move towards one another until the jaws reach their closed position with further movement of the handles towards one another locking the jaws in place.

* * * * *